United States Patent
Wagner et al.

(10) Patent No.: US 6,295,519 B1
(45) Date of Patent: Sep. 25, 2001

(54) METHOD AND APPARATUS FOR COUPLING MULTIPLE COMPUTER PERIPHERALS TO A COMPUTER SYSTEM THROUGH A SINGLE I/O PORT

(75) Inventors: Richard Hiers Wagner, Atlanta, GA (US); Robert Leslie Wagner, Rochester, NY (US)

(73) Assignee: Datascape, Inc., Atlanta, GA (US)

( * ) Notice: Subject to any disclaimer, the term of this patent is extended or adjusted under 35 U.S.C. 154(b) by 0 days.

(21) Appl. No.: 08/398,109

(22) Filed: Mar. 3, 1995

(51) Int. Cl.$^7$ .................................................. G06F 9/455
(52) U.S. Cl. ................... 703/25; 703/21; 710/8; 710/20; 710/100
(58) Field of Search .................................... 395/309, 500; 703/21, 23, 24, 25, 27; 710/8, 20, 62, 100, 107

(56) References Cited

U.S. PATENT DOCUMENTS

| | | | |
|---|---|---|---|
| 4,794,520 | * 12/1988 | Kobus, Jr. et al. ................... | 710/107 |
| 5,101,481 | * 3/1992 | Anger et al. .......................... | 395/309 |
| 5,264,958 | * 11/1993 | Johnson ................................ | 395/309 |
| 5,457,784 | * 10/1995 | Wells et al. .......................... | 395/829 |
| 5,488,705 | * 1/1996 | LaBarbera ............................ | 395/309 |
| 5,535,371 | * 7/1996 | Stewart et al. ....................... | 395/500 |

OTHER PUBLICATIONS

Leonard et al, "An RS–232–C Local Area Network", IEEE Proceedings of the 14th Conference on Local Computer Networks, Oct. 1989, pp. 130–132.*

Nigus et al, "An Easy-to-Use, Host-Independent Data Acquisition System", 6th IEEE Instrument and Measurement Technology Conference, Apr. 1989, pp. 86–91.*

\* cited by examiner

*Primary Examiner*—Kevin J. Teska
*Assistant Examiner*—Samuel Broda
(74) *Attorney, Agent, or Firm*—Maginot, Addison & Moore

(57) ABSTRACT

A method and apparatus for coupling multiple computer peripherals to a computer system through a single I/O port is disclosed. The inventive apparatus includes an interface device having a first connector for coupling to the I/O interface of a computer system, a second connector for coupling a first computer peripheral to the I/O port and a third connector for coupling a second computer peripheral to the I/O port so that both peripherals are simultaneously coupled to the I/O port. Within the housing of the preferred embodiment of the interface device, control and data lines for receiving data associated with the I/O interface are coupled from the first connector to the third connector and control and data lines for transmitting data associated with the I/O interface are coupled from the first connector to the second connector. By separating the transmit and data functions of the I/O interface so they may be routed to separate connectors, computer peripherals of difference types, i.e., input and output, may be simultaneously coupled to the computer terminal. The device of the present invention may also be used to separate data functions having different hardware specifications and protocols supported by an I/O interface.

20 Claims, 2 Drawing Sheets

METHOD AND APPARATUS FOR COUPLING MULTIPLE COMPUTER PERIPHERALS TO A COMPUTER SYSTEM THROUGH A SINGLE I/O PORT

FIELD OF THE INVENTION

This invention relates to computer communications, and more particularly, to the interfacing of computer peripherals to a computer system.

BACKGROUND OF THE INVENTION

Microprocessors have permitted a proliferation of devices which perform dedicated tasks for particular applications. In some of these applications the microprocessor's function may be altered by a user and in others it is not. For example, microprocessors used in automobiles to control fuel flow and ignition timing are typically sealed in an ignition control module while microprocessors used in microwave ovens to control cooking times and radiation power require parameters from a user typically input through a keypad. Devices of the latter type typically include a display for providing visual feedback of a users input to the microprocessor or computer system. Additionally, some microprocessors are used in handheld terminals which are carried to remote locations for the input of data, such as utility meter reading and the like. These devices sometimes include hard copy output to record the contents of an internal memory in the device.

One example of a computer system which uses a microprocessor to perform a dedicated function is a terminal for verifying credit or debit cards. Typically, these terminals include a housing for a microprocessor, memory, and I/O interfaces. The terminal also usually includes a ten key pad for inputting information or, alternatively, a card swipe slot for reading the magnetic identification of the card. Typically, data regarding the transaction is transmitted over a telephone line to a remote site for a credit authorization. These devices may further include a printer for printing out a charge card invoice for execution by the consumer. Thus, the typical credit card verification terminal has a central processing unit (the microprocessor), internal program and data memories, a ten keypad, a telecommunication port, and an input/output (I/O) port for interfacing a local peripheral, such as a printer, to the terminal.

One advantage of computer systems which perform dedicated functions is the ease in which the functions performed by the system may be modified. To modify or augment the functionality of a dedicated system, an additional application program may be loaded into memory through a telecommunication link (if coupled to the terminal) or the memory device which contains the control program for the system may be replaced with another memory device which contains an updated program. While the program that controls the system may be easily modified, the user interface remains limited. For example, in the verification terminal discussed above, the user is limited to the numeric input possible through the ten keypad. Thus, while the program which controls the system may be easily updated to perform additional functionality, the improved functionality is limited in the type of user interaction which may be received and used.

One possible solution which adds other user interface capability to the system is to use the I/O port through which the system communicates with the printer. Such a port may be used to communicate with a conventional keyboard, commonly known as a QWERTY keyboard. However, the connector for the cable which connects the printer to the terminal would have to be removed so the keyboard could be coupled to the system. As a result, when the keyboard is coupled to the terminal the printer cannot be used and vice versa.

What is needed is a way to expand the I/O interface so more than one computer peripheral may be coupled to the microprocessor terminal without interfering with the operation of another computer peripheral coupled to the same interface.

SUMMARY OF THE INVENTION

The problems noted above have been solved by an interface device having a first connector for coupling said interface device to said I/O port of the computer terminal, a second connector for coupling a first computer peripheral to a first data function of said I/O port and a third connector for coupling a second computer peripheral to a second data function of said I/O port so that said first and second computer peripherals may be simultaneously coupled to the I/O port of the computer terminal without interfering with the operation of one another.

In a preferred embodiment of the invention, the first connector on the interface device is adapted to fit an RS-232C port for the computer terminal. Opposite the first connector are the second and third connectors. The second connector may be used to couple an output device such as a printer or the like to the computer terminal and the third connector may be used to couple an input device such as a keyboard or the like to the computer terminal. Because the output device only receives data from the system terminal for display and the input device only transmits data for receipt by the terminal, both may share the I/O interface simultaneously without interfering with the operation of the other. The control lines for the interface may be provided to both the input and the output devices since the microprocessor within the terminal only drives one device at a time. Preferably, the connector includes a fourth connector for receiving power from an input power source or the like and supplying the power to the computer system or any device coupled to the connectors of the interface device.

The inventive interface device permits a conventional keyboard to be coupled to the computer terminal for providing alphanumeric characters to the computer terminal. In this manner, the user is provided with more flexibility in communicating with the program executing within the terminal without disrupting the ability of the printer or other computer peripheral to receive data from the terminal.

These and other advantages of the present invention may be discerned from a review of the detailed description provided below and the accompanying drawings.

BRIEF DESCRIPTION OF THE DRAWINGS

The present invention may take form in various components and arrangement of components and in various steps and arrangement of steps. The drawings are only for purposes of illustrating a preferred embodiment and are not to be construed as limiting the invention.

DETAILED DESCRIPTION OF THE INVENTION

Figure 1:
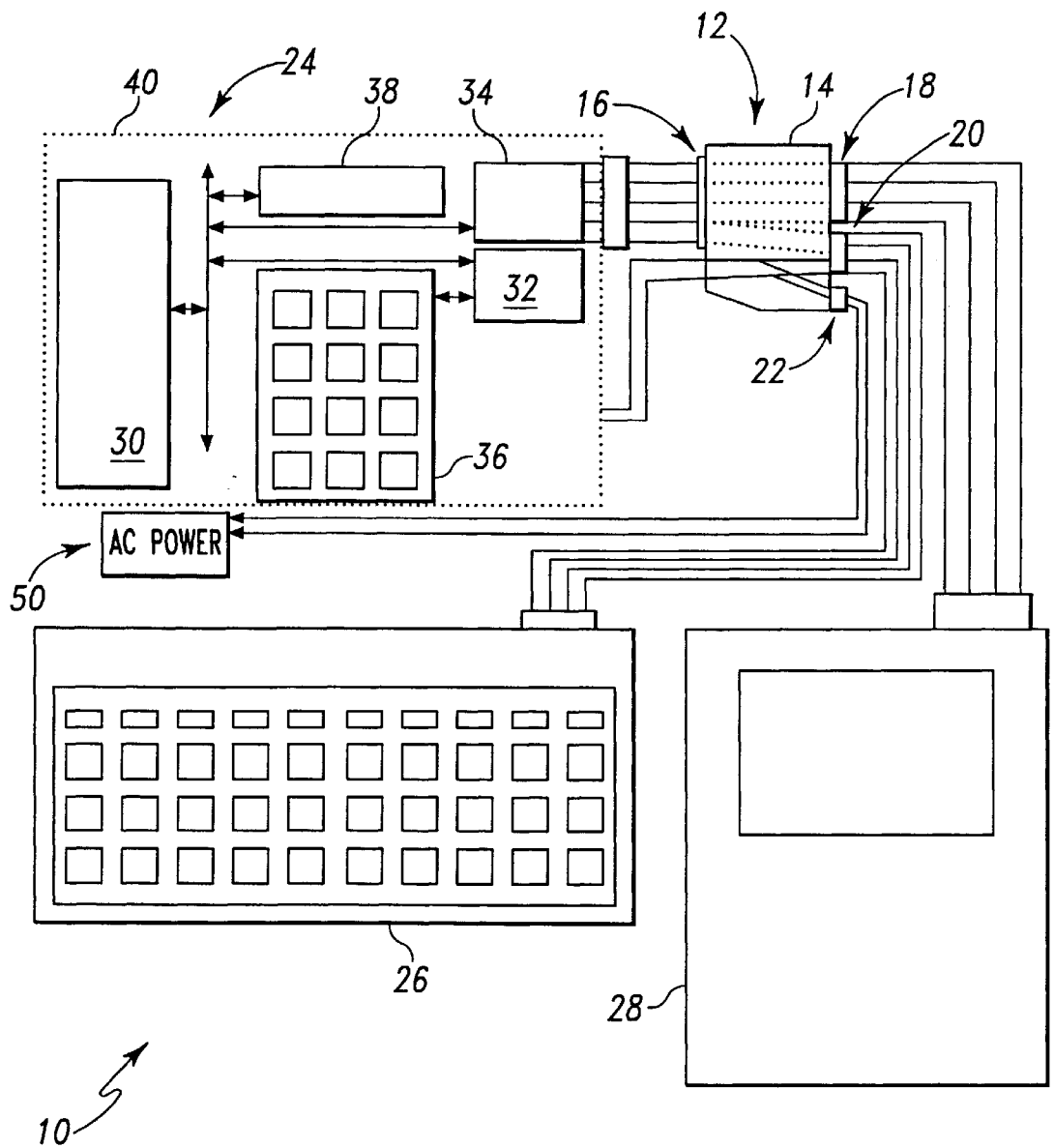
FIG. 1 is a block diagram showing the inventive interface device connecting two computer peripherals to an I/O port of a computer terminal.

A block diagram of a system 10 using an interface device 12 constructed in accordance with the principles of the present invention is shown in FIG. 1. The system 10 includes a computer terminal 24 to which a conventional QWERTY keyboard 26 and a printer 28 are coupled through interface device 12. The computer terminal 24 includes a processor 30, memory 32, I/O interface or port 34, a twelve key pad 36, and a display 38. Memory 32 may include both volatile and non-volatile memory. Additionally, terminal 24 may include a device such as a modem for communicating over telephone lines or the like. Computer terminal 24 is typically used to receive some user input through keypad 36 and display information through display 38. Previously, such systems may be alternatively coupled to a printer or keyboard through interface 34, but not both simultaneously. That capability has been supplied by the inventive interface device 12 shown in FIG. 1.

Interface device 12 includes a housing 14 having an I/O connector 16 and preferably, three device connectors 18, 20, and 22. Most preferably, I/O interface 34 is coupled to an RS-232 connector which is mounted to the housing 40 for computer terminal 24, although the inventive interface device may be used with I/O interfaces that support other hardware, timing, or protocol specifications or standards. As known in the art, a RS-232C interface includes transmit and receive control lines, a transmit data line, and a receive data line to support serial data communication between a computer device and a computer peripheral. Within device 12, the transmit control lines and the transmit data line may be coupled to printer 28 through connector 18 and the receive control lines and receive data lines may be coupled to keyboard 26 through connector 20.

Preferably, device connector 22 is provided to couple a power source to device 12 so power may be distributed to any connector of the device 12. As shown in the figure, power is provided by a 9 VAC power source although other AC or DC power sources may be used. Most preferably, the AC power is coupled to a filtering network before being passed through any connector of device 12, although the filtering network may not be required.

Figure 2:
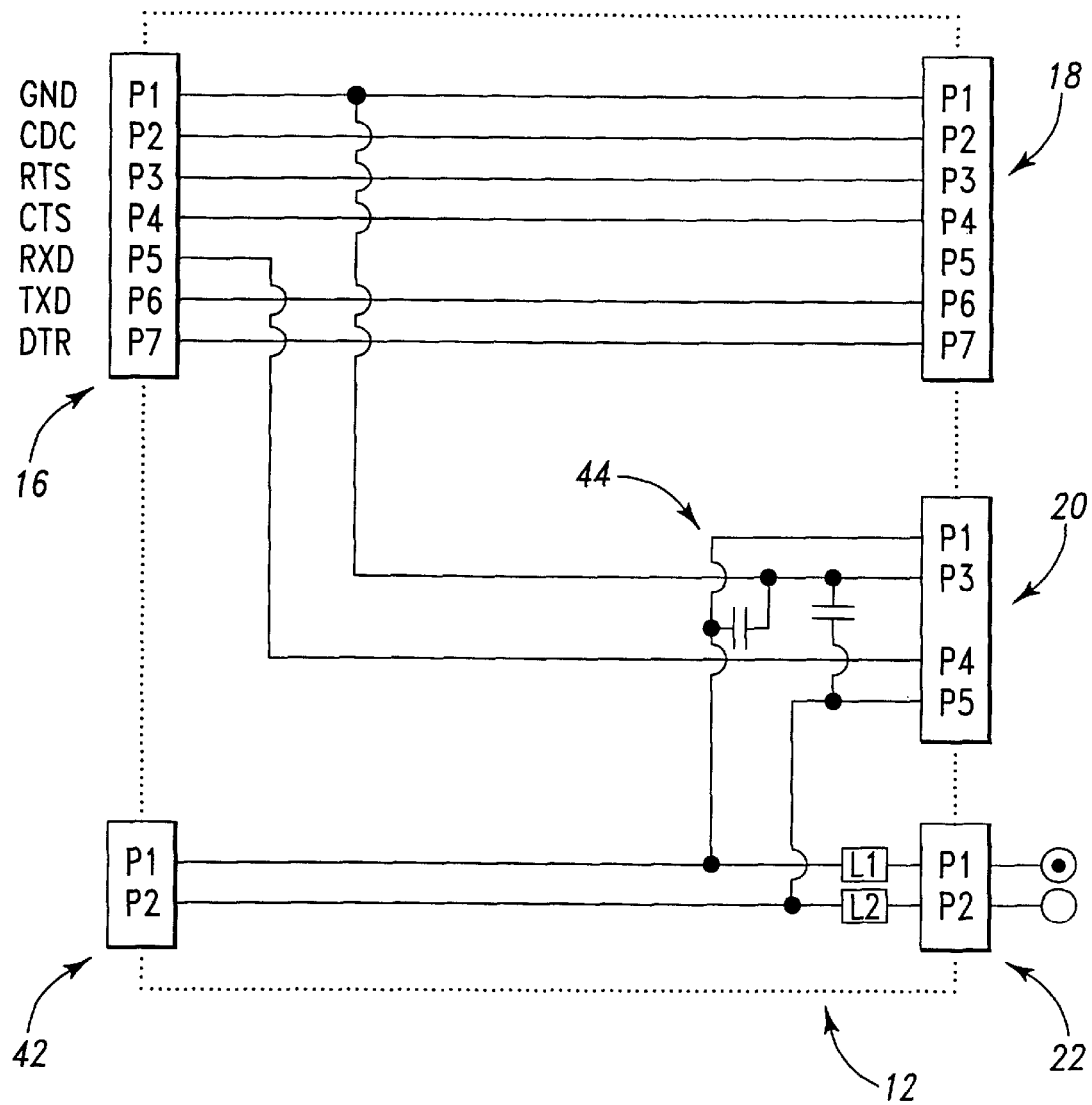
FIG. 2 is a wiring diagram of a preferred embodiment of the interface device shown in FIG. 1.

The preferred wiring within interface device 12 is shown in FIG. 2. As shown in that figure, the RS-232C connector mounted to the terminal housing 40 and its mating connector 16 of device 12 are represented by pins designated as P1–P7. The acronyms for these pins comport with their definition within the RS 232C interface standard. While the signals associated with P1–P7 are the only ones shown in the figure, other pins and their associated signals of a standard DB-25 connector may be provided to the interface device 12 and used. Likewise, other interfaces may be coupled to an interface device 12 built in accordance with the principles of the present invention as long as the interface separates two different data functions of the I/O interface for the computer terminal or system so that two devices having differing I/O functions may be coupled to the computer system through device 12.

As shown in FIG. 2, the signals associated with P1–P4 and P6–P7 of the preferred RS-232C interface are preferably supplied to P1–P4 and P6–P7, respectively, of connector 18. This wiring arrangement provides data along with the necessary control signals to connector 18 so it may be coupled to the printer 28 through an electrical cable. For connector 20, the signal ground (P1) and receive data line (P5) of connector 16 are coupled to P3 and P4 of connector 20, respectively, to receive data from keyboard 26 and supply it to terminal 24. An embodiment having connectors 18 and 20 alone for coupling an input device and an output device to the I/O interface of terminal 24 would be an alternative embodiment of the present invention. Thus, an interface device built in accordance with the principles of the present invention, may separate the input data function from the output data function of an I/O interface and route the control and data lines corresponding to those functions to an input device and output device, respectively.

In the preferred embodiment of FIG. 2, power, which preferably is 9 VAC power, is supplied from a source 50 (FIG. 1) through a coaxial cable to the pin (P1) of connector 22 which mates with the central conductor of the coaxial cable. The power ground from the power source is also coupled to a pin (P2) of connector 22 which mates with the electrical shield of the cable. Preferably, connector 22 is of the type commonly known as a BNC connector although other connector types may be used to supply power to device 12. Power and power ground may be coupled from P1 and P2 of connector 20 to P1 and P2 of connectors 20 and 42, respectively. In this manner, power is provided for keyboard 26 through connector 20 and to terminal 24 through connector 42. Alternatively, power may be supplied to any connector within device 12. Most preferably, a coupling circuit 44 is provided to reduce noise which may interfere with the other signals within device 12. The circuit shown in FIG. 2 is merely exemplary as such circuits are well known in the art.

While the device 12 has been shown in a preferred form for use with a RS-232C interface standard, a device 12 incorporating the principles of the present invention for interfaces that support other hardware specifications, standards, and protocols. For example, interfaces that provide sets of transmit data and receive data pins are known. Typically, one transmit pin operates on transistor-to-transistor logic (TTL) level voltages and the other pin may operate on RS-232C level voltages. However, such interfaces still may only be used by one type of device at a time. By using a device 12 as described above, the TTL data function may be routed to one connector and the RS-232C data function may be routed to another connector. In this manner, both types of devices may couple to the I/O interface without interfering with the operation of one another. In a similar manner, different protocols or communications types may be supported by a device 12. For example, an I/O interface for a computer system may communication data both asynchronously and synchronously. These different data functions may be routed to computer peripherals that communicate in one or the other of these modes for simultaneous access to the I/O port.

The reader should also appreciate that the term I/O interface or port does not require that the interface support both input and output functions. Instead, an I/O interface may support a plurality of input functions only, each input function being implemented differently. A device 12 that separates these data functions so they may be simultaneously coupled to different computer peripherals is contemplated as being within the scope of the present invention.

In use, a terminal or system may be used in its typical mode of being coupled to a single device through an I/O interface such as a printer to provide a printed record of transactions or the like. If additional data input functionality is needed, a user may couple a device 12 to the I/O interface of the computer terminal. Output connector 18 may then be coupled to a output peripheral such as printer 28 and connector 20 to an input peripheral such as keyboard 26. If keyboard 26 requires power then an appropriate power source may be coupled to connector 22. If power is supplied to device 12 then power may also be supplied to terminal 24 or any other device through connector 42.

After the peripherals are coupled to the terminal through device 12, terminal 24 may receive data from the keyboard and output data to the printer while both are coupled to the terminal. In this manner, a user may communicate with an application program executing in terminal 24 such as an accounting summary program, for example. After the user is finished, device 12 may be removed and printer 28 coupled to the connector on terminal housing 40 or the cable between connector 20 and keyboard 26 may be removed and device 12 left coupled between terminal 24 and printer 28. Such an interface device 12 permits a user to communicate with terminal 24 using the full capability of a QWERTY keyboard without interfering with the output of data to the printer.

While the invention has been described in connection with a preferred embodiment, it is not intended to limit the scope of the invention to the particular form set forth, but is intended to cover such alternatives, modifications, and equivalents as may be included within the spirit and scope of the invention as defined by the appended claims.

What is claimed is:

1. An interface device for simultaneously interfacing two computer peripherals to a computer system through a single I/O port comprising:

a first connector for coupling to an I/O port of a computer system;

a second connector for separating a first data function of said I/O port from a second data function of said I/O port and for coupling a first computer peripheral to said first data function of said I/O port; and a third connector for separating said second data function of said I/O port from said first data function of said I/O port and for coupling a second computer peripheral to said second data function of said I/O port so that said first and second computer peripherals may be simultaneously coupled to separate data functions of said I/O port of the computer system without interfering with the operation of one another.

2. The device of claim 1 wherein said first data function is an output data function and said second data function is an input data function.

3. The device of claim 1 wherein said first data function conforms to a first data protocol and said second data function conforms to a second data protocol.

4. The device of claim 1 wherein said first data function conforms to a first hardware specification and said second data function conforms to a second hardware specification.

5. The device of claim 4 wherein said first hardware specification communicates data with transistor-to-transistor (TTL) logic levels and said second hardware specification communicates data with RS-232C voltage levels.

6. The device of claim 3 wherein said first data protocol communicates data asynchronously and said second data protocol communicates data synchronously.

7. The device of claim 1 further comprising:

a fourth connector for coupling a power source to at least one of said second and said third connectors so that power may be coupled to any computer peripheral coupled to said second or said third connectors.

8. The device of claim 2 wherein said I/O port is a RS-232C interface and said input data function at least includes a receive data line; and said output data function at least includes a transmit data line.

9. The device of claim 8 wherein said input data function further includes receive data control lines; and said output data function further includes transmit data control lines.

10. The device of claim 7 further comprising:

a filtering network coupled between said fourth connector and said at least one of said second and said third connectors to reduce noise for said signals being communicated within said connector coupled to said fourth connector.

11. A method for simultaneously coupling a plurality of computer peripherals to an I/O port for a computer system comprising:

separating a first data function of an I/O port from a second data function of said I/O port;

coupling a first computer peripheral to said separated first data function of said I/O port; and coupling a second computer peripheral to said separated second data function of said I/O port so that said first and second computer peripherals may be simultaneously coupled to separate data functions of said I/O port of the computer system without interfering with the operation of one another.

12. The method of claim 11 wherein said coupling first computer peripheral step couples to an output data function of said I/O port and said coupling second computer peripheral step couples to an input data function of said I/O port.

13. The method of claim 11 wherein said coupling first computer peripheral step couples to a first data function having a first data protocol supported by said I/O port and said coupling second computer peripheral step couples to a second data function having a second data protocol supported by said I/O port.

14. The method of claim 11 wherein said coupling first computer peripheral step couples to a first data function having a first hardware specification supported by said I/O port and said coupling second computer peripheral step couples to a second data function having a second hardware specification supported by said I/O port.

15. The device of claim 14 wherein said first hardware specification communicates data with transistor-to-transistor (TTL) logic levels and said second hardware specification communicates data with RS-232C voltage levels.

16. The device of claim 13 wherein said first data protocol communicates data asynchronously and said second data protocol communicates data synchronously.

17. The method of claim 11 further comprising:

coupling power to said interface device so that any computer peripheral coupled to said interface device may receive power.

18. The method of claim 12 wherein said coupling to said output data function step further includes the step of:

coupling at least a transmit data line from said I/O port to said first computer peripheral; and said coupling to said input data function step further includes the step of coupling at least a receive data line from said I/O port to said second computer peripheral.

19. The method of claim 18 wherein said coupling receive data line step further includes the step of:

coupling receive data control lines from said I/O port to said second computer peripheral; and said coupling transmit data line step further includes the step of coupling transmit data control lines from said I/O port to said first computer peripheral.

20. The device of claim 17 further comprising:

coupling a circuit to said power to reduce noise in signals being communicated within said interface device.

* * * * *